United States Patent
Wilson et al.

(10) Patent No.: US 9,778,659 B2
(45) Date of Patent: Oct. 3, 2017

(54) AGRICULTURAL AUTOPILOT STEERING COMPENSATION

(75) Inventors: Eric Karl Wilson, Cupertino, CA (US); John W. Peake, Mountain View, CA (US); Stephan Pleines, Sunnyvale, CA (US)

(73) Assignee: Trimble Inc., Sunnyvale, CA (US)

( * ) Notice: Subject to any disclaimer, the term of this patent is extended or adjusted under 35 U.S.C. 154(b) by 749 days.

(21) Appl. No.: 13/608,844

(22) Filed: Sep. 10, 2012

(65) Prior Publication Data
US 2014/0074340 A1    Mar. 13, 2014

(51) Int. Cl.
B62D 6/00 (2006.01)
G05D 1/02 (2006.01)
A01B 69/04 (2006.01)

(52) U.S. Cl.
CPC ......... G05D 1/0278 (2013.01); A01B 69/008 (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 3,912,037 A | 10/1975 | Krieg | |
| 4,515,221 A | 5/1985 | van der Lely | |
| 4,533,999 A * | 8/1985 | Lambregts | G05D 1/0676 244/183 |
| 5,519,614 A * | 5/1996 | Miichi | B62D 6/00 180/422 |
| 5,612,883 A * | 3/1997 | Shaffer | B60K 31/0008 340/435 |
| 6,789,014 B1 * | 9/2004 | Rekow | G01C 21/165 180/9.38 |
| 6,896,089 B2 * | 5/2005 | Mills | B62D 5/001 180/402 |
| 7,071,642 B2 * | 7/2006 | Wilton | B60L 3/0046 180/197 |
| 7,650,958 B2 * | 1/2010 | Welschof | B60K 6/26 180/305 |
| 7,835,832 B2 * | 11/2010 | Macdonald | A01B 69/008 701/24 |
| 7,860,628 B2 * | 12/2010 | Lange | G01C 21/20 342/357.2 |
| 8,131,415 B2 * | 3/2012 | Peake | G05D 1/0212 701/23 |
| 8,359,141 B1 * | 1/2013 | Lange | G01C 21/20 172/2 |
| 8,538,682 B1 * | 9/2013 | Vankatraman | G01S 19/27 701/408 |
| 9,067,132 B1 * | 6/2015 | Bergeron | A63F 13/00 |

(Continued)

OTHER PUBLICATIONS

Invitation to Pay Additional Fees and Communication Relating to the Results of the Partial International Search in PCT/US2013/058095, Aug. 12, 2014.

(Continued)

*Primary Examiner* — Jean-Paul Cass
(74) *Attorney, Agent, or Firm* — Kilpatrick Townsend & Stockton LLP

(57) ABSTRACT

Agricultural autopilot steering compensation provides improved steering control when steerable wheels lose traction and/or in tight turns.

10 Claims, 4 Drawing Sheets

(56) References Cited

U.S. PATENT DOCUMENTS

| | | | |
|---|---|---|---|
| 2002/0189222 A1* | 12/2002 | Reimers | A01D 69/02 56/14.7 |
| 2003/0146038 A1* | 8/2003 | Mills | B62D 5/001 180/422 |
| 2005/0192727 A1* | 9/2005 | Shostak | B60C 11/24 701/37 |
| 2005/0273218 A1* | 12/2005 | Breed | B60C 11/24 701/2 |
| 2006/0282205 A1* | 12/2006 | Lange | G01C 21/20 701/50 |
| 2008/0040004 A1* | 2/2008 | Breed | B60R 21/0134 701/45 |
| 2008/0046150 A1* | 2/2008 | Breed | B60R 21/0134 701/45 |
| 2008/0149412 A1* | 6/2008 | Osanai | F16D 27/102 180/443 |
| 2008/0167770 A1* | 7/2008 | Macdonald | A01B 69/008 701/24 |
| 2008/0275602 A1* | 11/2008 | Peake | G05D 1/0212 701/25 |
| 2008/0277188 A1* | 11/2008 | Hauser | B62D 3/02 180/422 |
| 2009/0014223 A1* | 1/2009 | Jones | B60K 17/16 180/65.8 |
| 2009/0228166 A1 | 9/2009 | Durkos | |
| 2009/0319128 A1* | 12/2009 | Lauer | B60W 50/16 701/42 |
| 2011/0035109 A1* | 2/2011 | Ryerson | B62D 9/00 701/42 |
| 2011/0060505 A1* | 3/2011 | Suzuki | B60T 7/12 701/42 |
| 2011/0118938 A1* | 5/2011 | MacDonald | A01B 69/008 701/41 |
| 2011/0142099 A1 | 6/2011 | Poncelet | |
| 2011/0196565 A1* | 8/2011 | Collins | A01B 69/007 701/26 |
| 2011/0196579 A1* | 8/2011 | Tokimasa | B60W 10/184 701/48 |
| 2011/0202238 A1* | 8/2011 | Cebon | B62D 7/159 701/41 |
| 2012/0029771 A1* | 2/2012 | Mackin | A01D 41/1278 701/41 |
| 2012/0116614 A1* | 5/2012 | Torres | G08G 5/0013 701/3 |
| 2012/0179322 A1* | 7/2012 | Hennessy | G05D 1/0278 701/25 |
| 2012/0215395 A1* | 8/2012 | Aznavorian | G05D 1/021 701/25 |
| 2012/0283913 A1* | 11/2012 | Lee | B62D 15/025 701/41 |
| 2013/0041549 A1* | 2/2013 | Reeve | B62D 15/025 701/28 |
| 2014/0052340 A1* | 2/2014 | Bajpai | B62D 6/00 701/42 |

OTHER PUBLICATIONS

International Preliminary Report on Patentability in PCT/US2013/058095, Mar. 10, 2015.

Office action in Chinese patent application 201380046054.5 corresponding to U.S. Appl. No. 13/608,844 (Jun. 22, 2016).

* cited by examiner

AGRICULTURAL AUTOPILOT STEERING COMPENSATION

TECHNICAL FIELD

The disclosure is related to steering control in agricultural autopilot systems.

BACKGROUND

Autopilot-guided farm vehicles are now considered a necessity for efficient farm operations. Autopilots drive more accurately than humans and never get tired. They improve the precision, and reduce the cost, of tilling, planting, spraying, harvesting and other tasks.

An agricultural autopilot takes over steering duties from a human operator. It may operate hydraulic control valves to actuate a steering mechanism or literally turn a steering wheel. A typical autopilot used in a farm tractor guides the tractor along a pre-programmed path by maneuvering the tractor's steerable front wheels.

Autopilot performance is degraded if the steerable wheels lose traction. This can happen when there is not enough weight on the wheels, when ground under the wheels is wet or loose, or when operating on a slope. Side hill operations can be especially irksome if a tractor keeps drifting or sliding downhill. Adding weight improves traction, but adding too much weight also causes undesirable soil compaction.

Even with good traction a tractor sometimes cannot turn as sharply as desired. As an example, tractors often cannot turn sharply enough to transition from one work row to the next in a single, smooth turn when turning around at the end of a field. Looping turn-around maneuvers (key hole turns) or backing up waste time and usable field area.

Thus, despite an autopilot's ability to steer the wheels of a tractor (or other agricultural vehicle) through their full range faster and more precisely than a human operator, an autopilot cannot guarantee that a pre-programmed path will always be followed accurately given less-than-ideal traction or mechanical steering limits. What is needed is a tractor autopilot that guides a tractor accurately despite these problems.

DETAILED DESCRIPTION

The agricultural autopilot steering compensation systems and methods described below use differential drive wheel torque inputs to augment conventional steering. This enables an agricultural autopilot to guide a vehicle along a desired path accurately even when conventional steering authority is reduced due to poor steerable wheel traction. Further, differential torque allows an autopilot to make quicker steering corrections than are possible by operating a conventional steering linkage. Finally, differential torque makes possible tighter turns than can be achieved with wheel steering alone.

The systems and methods described below are applicable to a wide range of agricultural vehicles. Thus, the word "tractor" is used as shorthand to mean tractors, harvesters, self-propelled sprayers, etc.

Figure 1:
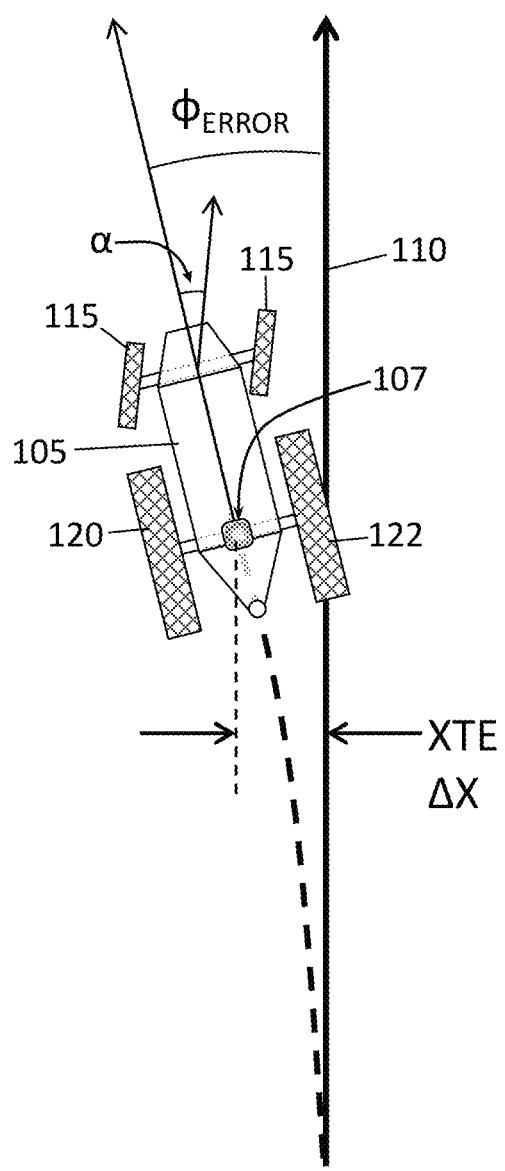
FIG. 1 is a top-view diagram of a tractor illustrating various parameters monitored by an autopilot.

FIG. 1 is a top-view diagram of a tractor illustrating various parameters monitored by an autopilot. In FIG. 1, tractor 105 is guided along pre-programmed path 110. The perpendicular distance from the path to a reference point 107 on the tractor is called the cross-track error, XTE or $\Delta X$. $\Delta X=0$ when the reference point coincides with the path. The heading error, $\phi_{ERROR}$, is the angular difference between the direction the tractor is headed and the direction of the pre-programmed path. $\phi_{ERROR}=0$ if the tractor heading is parallel to the path. The steering angle, $\alpha$, is the angle between the tractor's heading and the steerable wheels. $\alpha=0$ when the wheels are pointed straight ahead. Tractor 105 has two drive wheels, 120 and 122.

As described below, an autopilot may increase or decrease torque on the drive wheels independently. To assist a forward, right turn, for example, torque may be increased on left wheel 120 to promote forward rotation and decreased on right wheel 122 to retard forward rotation. Thus, the autopilot controls drive wheel torque to augment conventional steering.

One way to conceptualize the effect of differential wheel torque control on steering is to consider an effective steering angle. When driving on ground with good traction, e.g. level, dry pavement, the effective steering angle is the same as the actual steering angle, $\alpha$. When a tractor suffers from poor steerable wheel traction, however, the effective steering angle may not be what is expected or desired by an operator. The effective steering angle is an angle that, if it were achieved in practice under good traction conditions, would lead to a tractor trajectory having the same curvature as the actual trajectory. The effective steering angle may be less than a (e.g. slower turn than expected) or more than a (e.g. sliding with steerable wheels pointed straight). With the aid of differential torque advancing or retarding individual drive wheels, the effective steering angle may be controlled. For example tighter than normal turns may be accomplished when the effective steering angle is made greater than $\alpha$. Thus, an autopilot may use differential torque to augment conventional steering to achieve an effective steering angle that results in a trajectory that matches the curvature of a desired path.

Differential torque and the effective steering angles that result from it are useful for at least three purposes: i. to reduce heading and cross-track errors, ii. to change vehicle heading more quickly than conventional steering slew rate allows, iii. to sharpen a turn (i.e. increase curvature) when conventional wheel steering has reached a mechanical limit.

An autopilot employs a control system that minimizes heading and cross-track errors. Measured errors are digitally filtered and correction signals are applied to steering actuators to guide a vehicle toward a pre-programmed path. Differential drive wheel torque may be used as an additional steering actuator to guide the vehicle. Torque may be applied when errors exceed a threshold value or it may be applied as a function of the size of the error; e.g. it may be applied in proportion to the error. To correct persistent errors (e.g. downhill drift during side hill operations), torque may be applied in proportion to the time integral of cross-track and/or heading error. Alternatively, to correct for sudden errors (e.g. a sudden slip), torque may be applied in proportion to the time derivative of cross-track and/or heading error. Said another way, application of differential torque to assist conventional steering may be controlled with a proportional-integral-derivative (PID) feedback loop that minimizes cross-track and/or heading errors with respect to a pre-programmed path.

When an autopilot relies on maneuvering steerable wheels to change vehicle heading, heading acceleration is limited, in part, by how fast the wheels can change steering angle, $\alpha$. Transitioning from a hard left turn to a hard right turn may take a few seconds, for example. (The rate of change of $\alpha$ may be referred to as the steering slew rate.) When differential torque is available as a steering actuator, heading changes can be made faster than through actual steering angle changes alone. Said another way, the effective steering angle can be changed faster than the actual steering angle.

Differential torque as a steering actuator enables faster steering angle changes, but the price paid for this increased maneuvering performance is more energy used for steering. A simple differential torque system may only include differential braking. The more often brakes are applied, the more energy is required to keep a tractor moving at a desired speed. More advanced differential torque systems may add and subtract wheel torque via electric motor/generators. Power generated by retarding the inside wheel in a turn may be used to add torque to the outside wheel. This is more efficient that braking alone, but does not eliminate the energy requirements of differential torque systems. In general, how much and how often to use differential torque to augment conventional wheel steering depends on system tuning for specific applications.

A tractor autopilot may be engaged, i.e. actively guiding the tractor along a path, or disengaged, i.e. permitting manual steering control by an operator. (For safety, most autopilots disengage automatically whenever an operator turns the steering wheel.) Even when an autopilot is disengaged, however, manual steering commands generated by rotation of the steering wheel may be processed by an autopilot before being translated into hydraulic steering valve operations.

Steerable wheels may be turned until the steering angle, $\alpha$, reaches a mechanical limit. An autopilot with differential torque steering compensation allows an operator to sharpen a manual turn beyond the conventional steering angle mechanical limit. As the operator turns the steering wheel past the limit of conventional steering the autopilot applies torque to the drive wheels to retard the wheel on the inside of the turn (i.e. right wheel in a right turn) and/or advance the wheel on the outside of the turn. The amount of differential torque applied increases as the steering wheel is turned to produce an effective steering angle greater than the actual steering angle.

Figure 2:
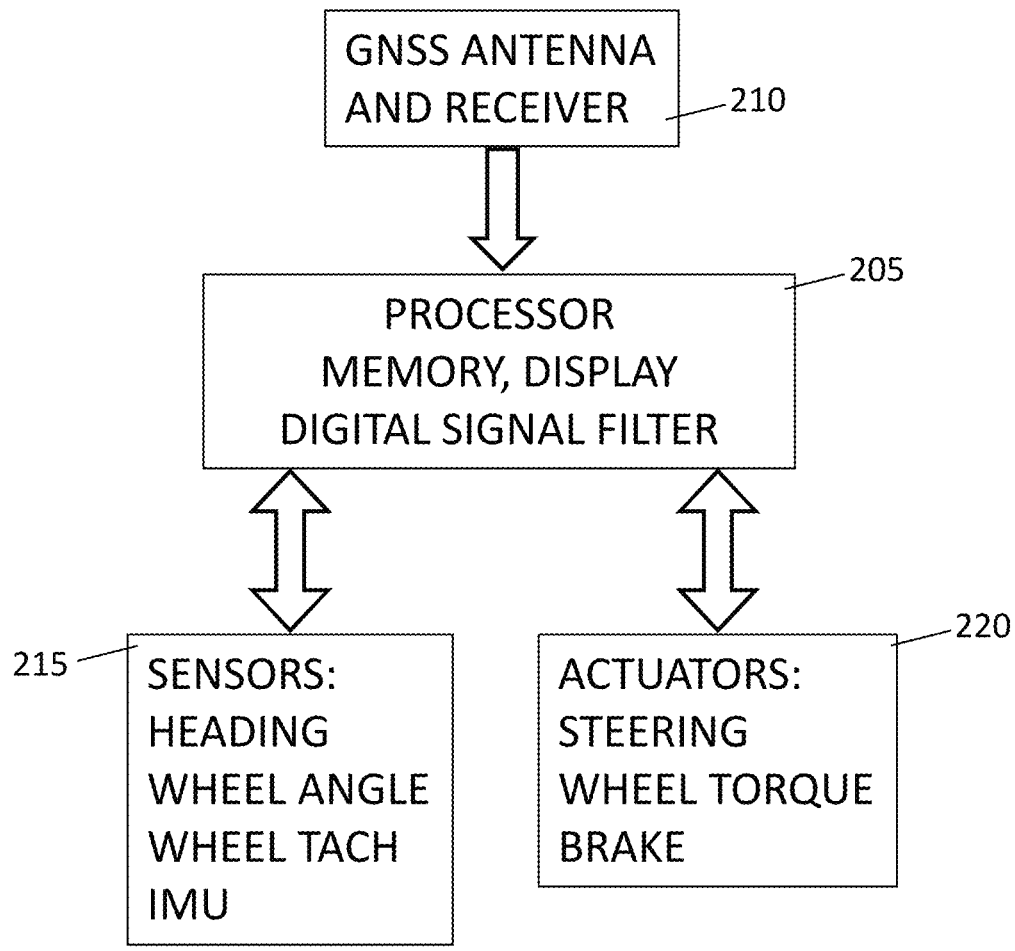
FIG. 2 is a block diagram of a tractor autopilot system.

Agricultural autopilot steering compensation systems include global navigational satellite system (GNSS) receivers (e.g. GPS receivers), sensors, actuators and processing units. FIG. 2 is a block diagram of such a tractor autopilot system. In FIG. 2, processor block 205 includes a microprocessor, memory, display and digital signal filter. The filter may be implemented in software in the microprocessor. A GNSS receiver 210 supplies position, velocity and time information to the processor. Sensors 215 may include a heading sensor, wheel angle sensor, wheel tachometer, an inertial measurement unit (IMU), and/or a steering wheel sensor. Actuators 220 may include steering, wheel torque and brake actuators. The functional blocks outlined in FIG. 2 are now described in more detail.

Processor block 205 receives data from sensors and from GNSS receiver 210. It processes this data with digital filters to estimate a tractor's state, i.e. its position, velocity, attitude, etc. The processor block guides the tractor toward a desired path via actuators such as steering, wheel torque and brakes. The processor may implement feedback algorithms to reduce the error between a tractor's estimated state and a desired state, feedforward algorithms to plan a future tractor trajectory, or both.

Tractor position and velocity may be estimated using GNSS antenna and receiver 210. The GNSS receiver may take advantage of differential corrections, e.g. WAAS corrections, and/or use real time kinematic positioning techniques.

Sensors 215 may include an IMU that provides heading, and pitch, roll and yaw rates. IMU outputs may be combined with GNSS outputs in a Kalman filter to provide a best estimate of a tractor's state. Wheel angle may be sensed with a potentiometer sensor or by comparing wheel and vehicle yaw rates using wheel and vehicle yaw rate gyros. Output from wheel tachometers may be used to detect wheel slippage.

Actuators 220 may include a servo motor that turns the steering wheel in a tractor or actuators that operate hydraulic steering valves. Brake actuators operate wheel brakes on a tractor's main drive wheels independently. Brakes are the simplest form of torque actuator. Of course, brakes can only slow down the forward or backward rotation of a wheel. Examples of wheel torque actuators that can add as well as subtract torque include electric motor/generators. When operated as motors, torque is added to a drive shaft; when operated as generators, torque is subtracted.

Figure 3:
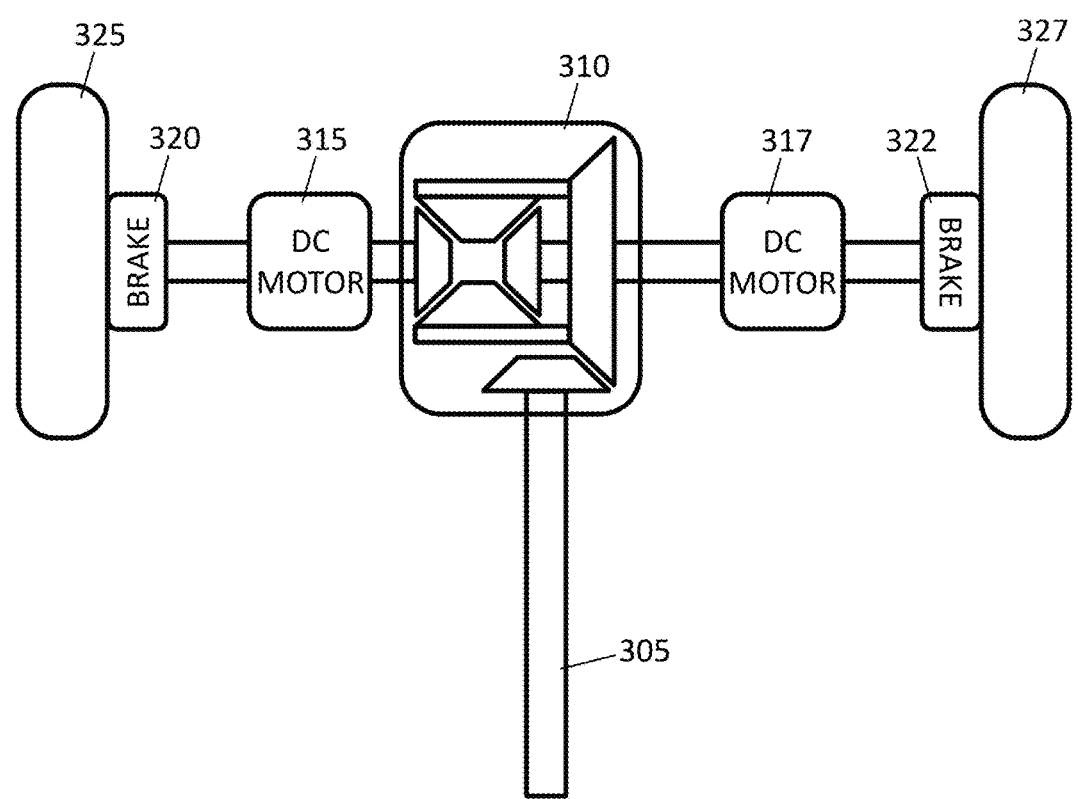
FIG. 3 is a schematic diagram of a system that provides differential torque to tractor drive wheels.

FIG. 3 is a schematic diagram of a system that provides differential torque to tractor drive wheels. In FIG. 3 driveshaft 305 supplies torque from an engine (not shown) to differential gear box 310. Torque from the differential is then applied to wheels 325 and 327. Brakes 320 and 322 and optional DC electric motor/generators 315 and 317 affect the amount of torque applied to the wheels. If wheel 325 is the right wheel of a tractor, then braking applied by brake 320 tends to yaw the tractor to the right. Similarly if wheel 327 is the left wheel of a tractor, then adding torque via motor 317 tends to yaw the tractor to the right. Adding torque via motor 317 and subtracting torque via motor 315 increases the magnitude of the effect.

When a motor/generator subtracts torque from a drive shaft, it generates electrical power. In a vehicle equipped with electric motor/generators as shown in FIG. 3, torque may be transferred from one wheel to another by connecting the electric output of a motor/generator acting as a generator to the electric input of a motor/generator acting as a motor. Torque may subtracted from the inside wheel and added to the outside wheel in a turn by providing an electrical connection between motor/generators connected to the wheels.

Tractors powered by individual wheel hydraulic motors offer additional opportunities for differential torque drive systems. Self-propelled sprayers, for example, use individual wheel hydraulic motors to avoid continuous axles and therefore provide high ground clearance. Vehicles having this type of drive system may be modified by providing individual hydraulic control valves for each wheel's hydraulic motor. An autopilot may then control hydraulic valve actuators to apply torque to each wheel individually.

Figure 4:
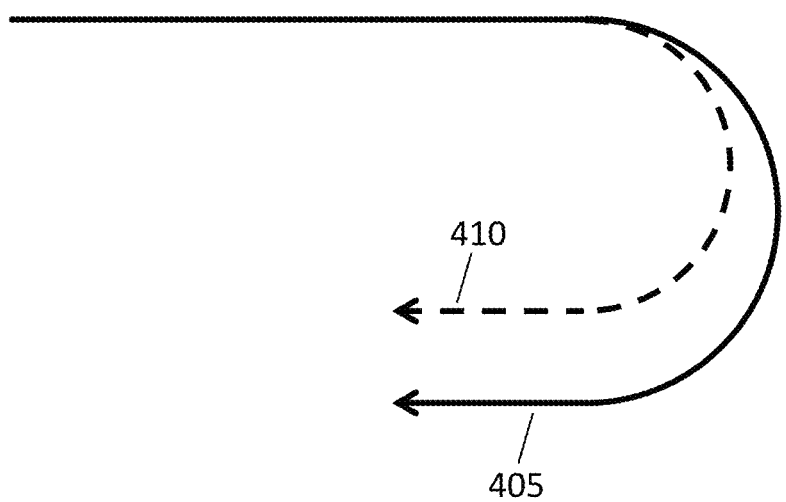
FIG. 4 illustrates paths that can and cannot be followed using a maximum actual steering angle.

FIG. 4 illustrates paths that can and cannot be followed using a maximum actual steering angle. Path 405 represents the sharpest turn that can be achieved with conventional steering. A tighter turn 410 may be achieved by subtracting torque from a wheel on the inside of the turn, by adding torque from a wheel on the outside of the turn, or both.

Differential torque applied to the drive wheels of a tractor effectively adds an additional steering actuator that may be used by an autopilot to guide the tractor along a desired path. This effective steering actuator may be used to augment or compensate traditional steering actuators to improve autopilot performance. An autopilot with steering compensation may track a desired path more accurately and recover from slips away from the path more quickly than would otherwise be possible. Differential torque also enables a tractor to make tight turns which are useful at end-of-row turnarounds among other maneuvers.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for guiding a vehicle along a path comprising:
    providing an autopilot system including:
        position, velocity and heading sensors; and,
        steering actuators and drive wheel torque actuators;
    estimating a state of the vehicle by digitally filtering data provided by the sensors; and,
    reducing heading and cross-track errors between the state of the vehicle and a pre-programmed path by operating the steering actuators and the drive wheel torque actuators in response to a function of the errors.

2. The method of claim 1 wherein the function of the errors is proportional to the magnitude of the errors.

3. The method of claim 1 wherein the function of the errors is the time integral of the errors.

4. The method of claim 1 wherein the function of the errors is the time derivative of the errors.

5. The method of claim 1 wherein the function of the errors includes a threshold error value.

6. An agricultural autopilot comprising:
    a steering wheel sensor;
    steering actuators and drive wheel torque actuators; and,
    a microprocessor and memory that:
        i. estimate a desired steering angle based on data provided by the sensor and a digital filter,
        ii. operate the steering actuators and the drive wheel torque actuators to achieve an effective steering angle equal to the desired steering angle when the desired steering angle is less than or equal to an actual steering angle mechanical limit, and,
        iii. operate the steering actuators and the drive wheel torque actuators to achieve an effective steering angle greater than the actual steering angle when the desired steering angle is greater than the actual steering angle mechanical limit.

7. The autopilot of claim 6 wherein the drive wheel torque actuators include individual drive wheel brakes.

8. The autopilot of claim 6 wherein the drive wheel torque actuators include individual drive wheel electric motors.

9. The autopilot of claim 6 wherein the drive wheel torque actuators include individual drive wheel hydraulic motors.

10. A method for assisting an agricultural vehicle operator comprising:
    providing an autopilot system including:
        a steering wheel sensor; and,
        steering actuators and drive wheel torque actuators;
    estimating a desired steering angle based on data provided by the sensor and a digital filter;
    operating the steering actuators and the drive wheel torque actuators to achieve an effective steering angle equal to the desired steering angle when the desired steering angle is less than or equal to an actual steering angle mechanical limit; and,
    operating the steering actuators and the drive wheel torque actuators to achieve an effective steering angle greater than the actual steering angle when the desired steering angle is greater than the actual steering angle mechanical limit.

* * * * *